Aug. 24, 1943.                C. H. WHITE                2,327,834
                               DISK HARROW
                           Filed Aug. 13, 1941
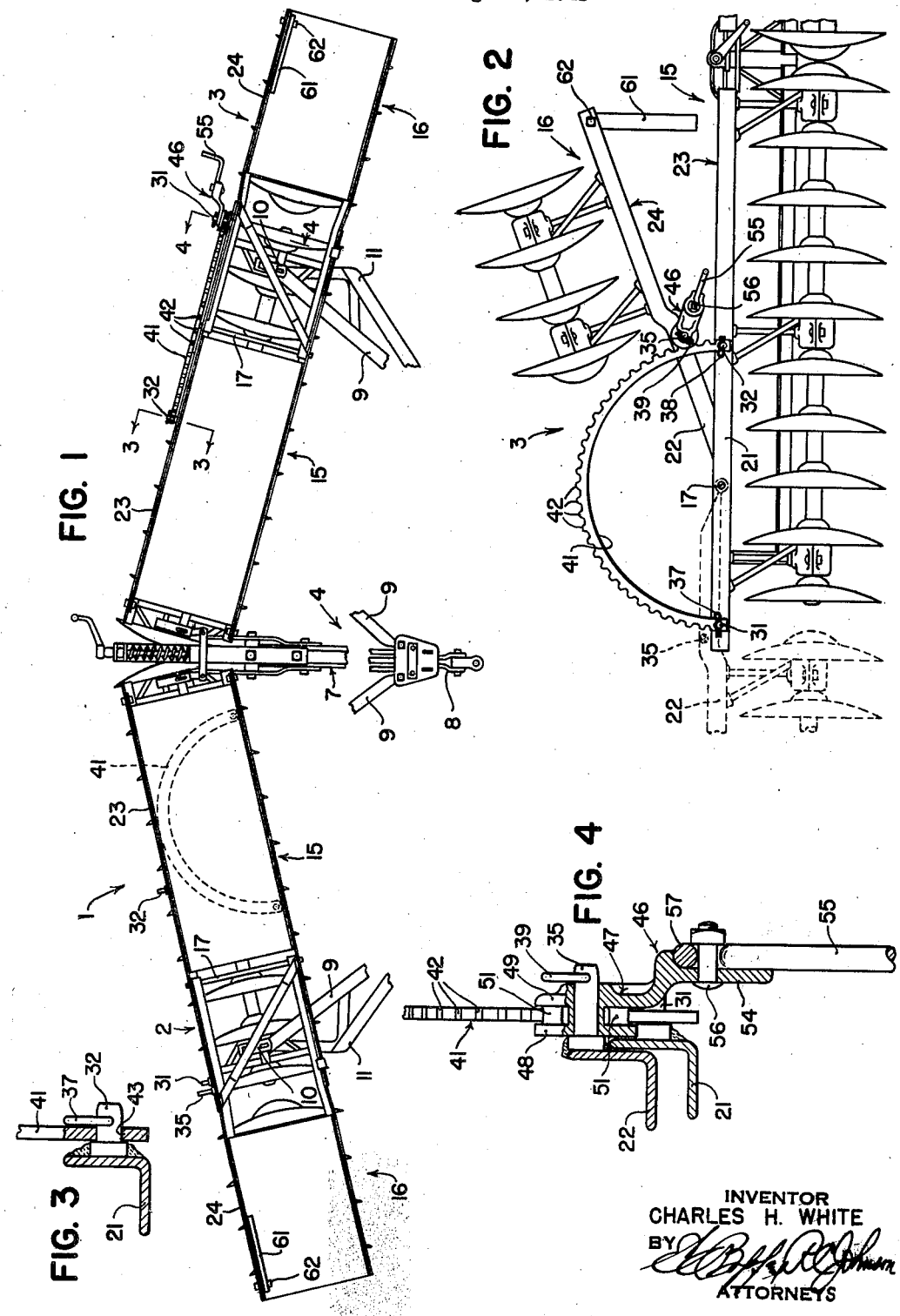
INVENTOR
CHARLES H. WHITE
BY
ATTORNEYS Patented Aug. 24, 1943

2,327,834

UNITED STATES PATENT OFFICE 2,327,834

DISK HARROW

Charles H. White, Moline, Ill., assignor to Deere & Company, Moline, Ill., a corporation of Illinois Application August 13, 1941, Serial No. 406,606

15 Claims. (Cl. 55—81)

The present invention relates generally to harrows and other agricultural implements and is more particularly concerned with implements of the type having pivotally interconnected sections by which the effective width of the implement, or the area of ground tilled, may be reduced by swinging one section out of working position. An implement of this kind is the wide cut single action disk harrow in which each disk gang consists of inner and outer sections, with the outer sections pivoted to the inner sections so as to be movable out of alignment and over onto the inner sections. In the larger tractor drawn machines of this type, the outer sections of such disk harrows are quite heavy, and it is difficult for a farmer to lift up the outer section and swing it over onto the inner sections when it is desired to reduce the width of the implement. Not only is it an arduous task to lift up the outer section and swing the same over onto the inner sections, but also it is a dangerous one. The disks are sharp, and if the farmer should accidentally let an outer section drop, particularly when swinging it over into an aligned position, there is considerable risk to the personal safety of the farmer.

The object and general nature of the present invention is the provision of means making it easy for the farmer to fold over the extension gangs onto the inner gangs. More specifically, it is a feature of this invention to provide rack and pinion means, with a crank for rotating the pinion, whereby the farmer by turning the crank can swing the outer or extension gang over onto the inner gang or vice versa, with the exertion of only a small amount of force and without any particular danger of dropping the pivoted section. Further, it is another feature to provide a mechanism of this kind, preferably in the form of an attachment, which is detachably associated with the harrow sections so that a plurality of them may be controlled by providing only one such attachment. Specifically, it is a feature with which to provide a disk harrow with studs or the like to receive the crank pinion and rack, whereby after using the crank pinion and rack for swinging one section over onto the companion section, the crank pinion and rack may be disconnected and applied to the other gang for raising one of the sections over onto the other, or bringing it from a folded position back into a position of alignment with the companion section.

A further feature of this invention is the provision of support or stop means carried by the foldable section and automatically positioned by the movement of that section into folding position so as to limit the folding movement of the pivoted section. Specifically, it is a feature of this invention to provide a swingable arm pivoted to the outer section in such a manner as to lie along the frame of the outer section when it is in a position of alignment with the inner section, the arm pivots are so arranged, however, that when the outer section is swung over onto or above the inner section, the arm swings downwardly by gravity into position serving as a strut or stop for limiting the downward movement of the foldable section relative to the other section to which it is pivoted.

These and other objects and advantages of the present invention will be apparent to those skilled in the art after a consideration of the following detailed description, taken in conjunction with the accompanying drawing.

In the drawing:

Figure 1 is a plan view of a disk harrow in which the principles of the present invention have been incorporated;

Figure 2 is a rear view of the left gang, showing the extension section in folded position in full lines and in extended or operating position in broken lines;

Figure 3 is a section taken generally along the line 3—3 of Figure 1; and

Figure 4 is a section taken generally along the line 4—4 of Figure 1.

Referring now to the drawing, particularly Figures 1 and 2, the present invention is shown as embodied in a disk harrow, indicated in its entirety by a reference numeral 1 which comprises right and left hand disk gangs 2 and 3 and associated hitch mechanism 4. In its general details, the disk harrow 1 is essentially like the disk harrow shown in the patent to John E. Hoffman, 1,846,005, dated February 15, 1932, to which reference may be made if necessary. Briefly, the hitch 4 includes a main or central hitch member 7 having a pair of telescoping parts, one of which is indicated as 8, and two outwardly extending laterally divergent diagonal draft members 9, the rear ends of which are connected with the disk gangs 2 and 3 by any suitable pivot means 10. The rear ends of the draft links 9 are reinforced by suitable braces 11.

Each of the disk gangs 2 and 3 is made up of two sections indicated in Figure 2 by the reference numerals 15 and 16, the former being considered the main section to which the rear end of the associated draft link 9 is connected, as at 10, and the outer section 16 being the extension section. Each extension section 16 is pivotally connected with the associated inner section by a shaft or rod 17 which preferably is received in openings in the angles 21 and 22 forming a part of the main and extension frames 23 and 24. The pivot 17 is spaced laterally inwardly from the outer end of the associated main section 15, and the frame angles 21 and 22 are so arranged that when the sections 15 and 16 are disposed in alignment, the angles 22 fit within the angles 21 of the main frame section 23, as indicated in dotted lines in Figure 2. Each of the disk gangs 2 and 3 is constructed as described above, each having an extension section that is movable from an aligned position over into a transport or narrow cut position above the associated inner section.

The rear frame member 21 of each of the inner sections 15 of the right hand gang 2 (Figure 1) is provided with a pair of studs 31 and 32 welded or otherwise secured to the vertical flange thereof, whereby the studs 31 and 32 form a part of the inner section. The rear angle 22 of the extension frame 24 is provided with a stud 35 somewhat longer than the other studs 31 and 32, as shown in Figure 1. The left hand gang 3 is provided with like studs, and each of the studs 31, 32 and 35 is provided with an opening at its outer end to receive spring or hitch pin locks 37, 38 and 39, respectively (Figure 2). An arcuate rack 41 having teeth 42 is adapted to be placed on the pair of studs 31 and 32 of either of the disk gangs 2 and 3. In Figure 2 the rack 41 is shown as placed on the studs 31 and 32 of the inner section 15 of the left hand gang 3. The ends of the rack 41 are apertured, as at 43 (Figure 3), so as to be adapted to pass loosely over the studs 31 and 32.

For meshing with the teeth 42 of the rack 41 I provide a crank pinion indicated in its entirety in Figure 4 by the reference numeral 46. The crank pinion 46 comprises a pinion section 47 having laterally spaced apart flanges 48 and 49 between which teeth 51 are disposed, the teeth 51 meshing with the teeth 42 and the rack 41. Preferably, the pinion section 47 is in the form of a casting with the teeth 51 cast integrally with the flanges 48 and 49. The member 47 also includes an arm to which a crank handle 55 is adapted to be connected by suitable means such as a bolt 56. The crank arm 55 has an eye 57 through which the bolt 56 is disposed. The pinion crank 46 is adapted to pass loosely over the stud 35 and is held against displacement by the pin lock 39.

When the outer section 16 of either gang is pivoted upwardly and then over the other or inner section 15, it is desirable to limit the downward movement of one section with respect to the other. With this end in view I provide an arm or supporting strut 61 pivoted, as by bolt 62, to the outer end of the rear frame angle 22 of the extension frame 24. When the extension sections are in extended or aligned position, as shown in Figure 1, the strut 61 lies along the frame angles, but when the upper end of the extension section is swung over above the inner section 15, the arms of struts 61 swing downwardly by gravity into substantially the position shown in Figure 2 in full lines, in which each is adapted to engage the frame angle directly underneath, thus serving as a stop to limit the folding movement of the outer associated section.

The operation of the form of present invention described above is substantially as follows:

Figure 1 shows the disk harrow 1 in its wide cut position, with the extension gang sections 16 in alignment with the inner sections 15. When the farmer desires to reduce the width of the harrow, as to cut a more narrow strip of soil, or to transport the harrow through a narrow gate, or for other reasons, he first applies the crank pinion 46 to the stud 35 of the extension section that he first desires to fold over. After the crank pinion 46 is installed in place and the locking pin 39 inserted, the farmer then places one end of the rack 42 over the inner stud 32, with the other or outer end of the rack in a lowered position. After the locking pin 38 is installed in the stud 32, the rack 41 is then raised about the stud 32 as a pivot, which brings the teeth 42 of the rack 41 to mesh with the teeth 51 of the pinion crank 46. The opening 43 in the other end of the rack 41 is then placed over the outer stud 31 and the locking pin 37 inserted in the hole of the stud 31.

The farmer is now ready to swing the section 16 upwardly and inwardly over onto the inner section 15. This he does by turning the crank member 46, which causes the pinion section 47 to roll upwardly and along the rack 41, lifting the extension section and pivoting it about the axis 17 over into the full line position shown in Figure 2. As the section swings upwardly past dead center, the arm or strut member 61 then swings downwardly into a position, as shown in Figure 2, in which it is ready to engage the frame angle 21 directly underneath it. Figure 2 shows the parts just before the extension section 16 reaches its lowered position. When the weight of the extension 16 is supported by the strut 61, the quick detachable locking pins 37, 38 and 39 may be removed and the rack and crank pinion moved to the other side and used in the same manner as described above, for swinging the right hand extension section over onto the right hand inner section.

When in operation, or also when transporting, if desired, the rack and crank pinion may be left in position at one side or the other, as desired, or either or both may be removed and carried on the harrow in any suitable position, such as in one of the weight boxes, as indicated in dotted lines in Figure 1. Suitable fastening means may be provided for holding the crank pinion and rack against falling out of the weight box. It will also be understood that two racks may be provided, if desired, with two associated crank members, becoming thereby a part of the two right and left hand gangs. I prefer, however, the single structure described above since it is more simple and inexpensive. The crank 55 may be made on as long a radius as may be necessary to secure the desired easy turning action. It will also be understood that two pinions may be permanently mounted on the respective extensions, with only one rack, which may be optionally disposable on either of the two inner sections as described above, or two racks and one interchangeable crank pinion.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent, is:

1. In a disk harrow, the combination of two oppositely extending disk gangs, each of said gangs comprising sections pivotally connected together for relative movement, mechanism optionally connectable with the sections of either gang for swinging one section thereof relative to the other, and means on the sections of both gangs adapted to receive said mechanism and support the latter in operative position for swingin one section of the gang relative to the other.

2. A disk harrow comprising a gang including pivotally connected gang sections, one being adapted to be swung generally above and over the other, pinion means on one section, rack means on the other section, and means for rotating said pinion means for swinging one section relative to the other.

3. In a disk harrow, a combination of two oppositely extending disk gangs, each of said gangs comprising sections pivotally connected together for relative movement in a generally vertical plane, studs fixed to the sections of each gang, and an operative mechanism adapted to be connected with said studs of one section of either of said gangs swinging said one section thereof relative to the other section.

4. In a disk harrow, a combination of two oppositely extending disk gangs, each of said gangs comprising sections pivotally connected together for relative movement in a generally vertical plane, studs fixed to the sections of each gang, a rack adapted to be detachably mounted on the studs of one section of either gang, and a pinion adapted to be detachably mounted on the studs of the other section for swinging said one section relative to the other.

5. In a disk harrow, the combination of two disk gangs, each gang comprising two sections pivotally connected for relative movement, and means interchangeably connected with the sections of either gang for swinging one section of either gang relative to the other section of that gang.

6. In a harrow, a gang comprising two sections pivotally connected for movement in a generally vertical plane, so as to provide for swinging one section out of aligned position with the other and generally over onto the other section and substantially directly above the latter, and stop means carried by a swingable section in depending relation and positioned by the movement of the swingable section into a position over the other section for engaging the latter and limiting the folded position of said sections.

7. In a harrow, a gang comprising two sections pivotally connected together, one section being movable into a position generally above the other section and the latter section having a substantially horizontal portion that underlies a portion of said one section when said one section overlies the other section, and means movably carried by said portion of said one section and automatically positioned by the movement of said one section into a position over the other section for acting against said horizontal portion of said other section and limiting the movement of said one section relative to the other section.

8. In a harrow, a gang comprising two sections, means pivotally connecting said sections to provide for swinging one section out of alignment with the other section and into a position generally over said other section, each of said sections having a frame part and said sections being so pivotally connected that when one section is in a position over the other section said frame part of said one section is substantially directly over said frame part of said other section, and a stop arm pivoted to said frame part of said one section and adapted to be moved by gravity into a position engaging said frame part of said other section and thereby limiting the movement of said one section relative to the other section when said one section is folded over said other section.

9. In a disk harrow, a disk gang comprising two sections pivoted together, a rack fixed to one section and curved about the axis of pivotal movement of said sections, and a crank pinion carried by the other section in a position to mesh with said rack whereby rotation of said crank pinion serves to pivot one section relative to the other.

10. In a disk harrow comprising two oppositely extending disk gangs, each of said gangs comprising sections pivotally connected together for relative movement in a generally vertical plane, an arcuate rack, a crank pinion adapted to mesh with said rack, and means on the sections of each of said disk gangs for detachably receiving said rack and crank pinion, said last mentioned means being arranged so that a crank pinion is connectable with one section and the arcuate rack connectable with the other section with the crank pinion meshing with said rack, whereby rotation of said crank pinion serves to pivot one section of rack gang relative to the other, said arcuate pinion and crank pinion being also connectable with the rack and pinion receiving means of the other gang for pivoting one section of that gang relative to the other.

11. An agricultural implement comprising two parts, one swingable into a position generally above the other, and stop means pivotally carried by the swingable part and disposed in a position engaging a portion of the other implement part below the pivot of said stop means by movement of the swingable part into a position above the other part for limiting the movement of the latter.

12. A disk harrow comprising a pair of gangs, each including pivotally connected gang sections, one being adapted to be swung generally above and over the other, pinion means, rack means, means for detachably connecting said pinion means and rack means, respectively, with the pivotally connected sections of either gang, and means for rotating said pinion means for swinging one section relative to the other.

13. An agricultural implement comprising a pair of gangs, each including pivotally connected gang sections, one being adapted to be swung generally above and over the other, pinion means, rack means, means for detachably connecting said pinion means and rack means, respectively, with the pivotally connected sections of either gang, and means for rotating said pinion means for swinging one section relative to the other.

14. A disk harrow comprising a gang including pivotally connected gang sections, one being adapted to be swung generally above and over the other, pinion means on one section, rack means on the other section, means for rotating said pinion means for swinging one section relative to the other, and a depending strut pivoted for free swinging movement to said one section at a point which lies substantially directly above a part of the other section when the one section is swung over the other section, said depending strut being engageable with said other section so as to limit the movement of said one section toward said other section.

15. An agricultural implement including pivotally connected gang sections, one being adapted to be swung generally above and over the other, pinion means on one section, rack means on the other section, means for rotating said pinion means for swinging one section relative to the other, and a depending strut pivoted for free swinging movement to said one section at a point which lies substantially directly above a part of the other section when the one section is swung over the other section, said depending strut being engageable with said other section so as to limit the movement of said one section toward said other section.

CHARLES H. WHITE.